United States Patent [19]

Bailey

[11] 4,412,271

[45] Oct. 25, 1983

[54] SUPPORT FOR FACILITATING READING OF AN ELECTRIC METER

[76] Inventor: Herbert C. Bailey, 12209 Hanover St., Sunnymead, Calif. 92388

[21] Appl. No.: 286,692

[22] Filed: Jul. 24, 1981

Related U.S. Application Data

[63] Continuation of Ser. No. 78,178, Sep. 24, 1979, abandoned.

[51] Int. Cl.³ .............................................. H02B 9/00
[52] U.S. Cl. ............................... 361/370; 339/154 A; 361/375
[58] Field of Search ............... 174/72 C; 339/154 R, 339/154 A, 177 R; 361/364, 365, 369, 370, 371, 372, 375, 366; 324/110, 156

[56] References Cited

U.S. PATENT DOCUMENTS

| | | | |
|---|---|---|---|
| 1,760,921 | 6/1930 | Strongson | 339/159 C |
| 1,763,217 | 6/1930 | Buys | 361/371 |
| 2,275,753 | 3/1942 | Grieder | 361/369 |
| 2,606,232 | 8/1952 | St. John | 361/372 |
| 2,659,060 | 11/1953 | Cohane | 339/76 |
| 2,676,223 | 4/1954 | Whitaker | 339/154 A |
| 3,067,362 | 12/1962 | Patton | 361/368 |
| 3,549,951 | 12/1970 | Plummer | 361/369 |
| 3,715,627 | 2/1973 | D'Ausilio | 174/48 |
| 3,727,788 | 4/1973 | Holbrook | 220/367 |

FOREIGN PATENT DOCUMENTS 934022  9/1973  Canada ........................ 339/154 A

*Primary Examiner*—G. P. Tolin
*Attorney, Agent, or Firm*—John H. Crowe

[57] ABSTRACT

A support for an electric meter of the type used to measure energy supplied to customers of electric power companies or the like. The support is interposed between the meter and its customary base or socket and is settable to face the meter in either of two directions other than that in which it normally faces whereby to facilitate reading of the meter and also to enable a meter reader to read two or more meters from a single viewpoint.

5 Claims, 8 Drawing Figures

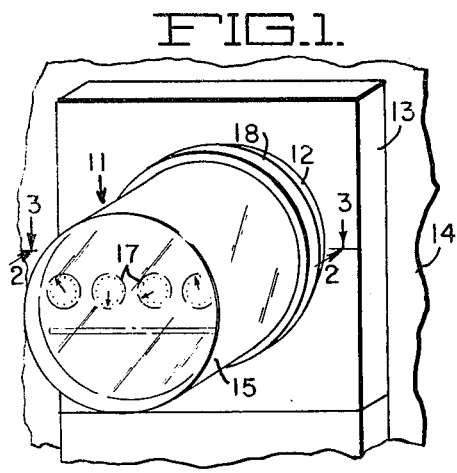
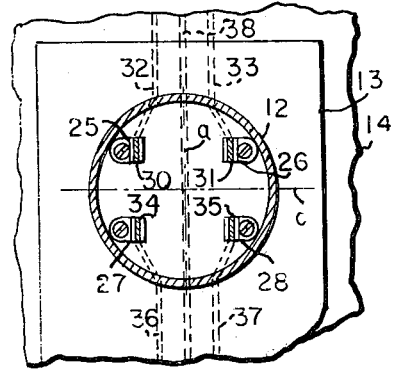
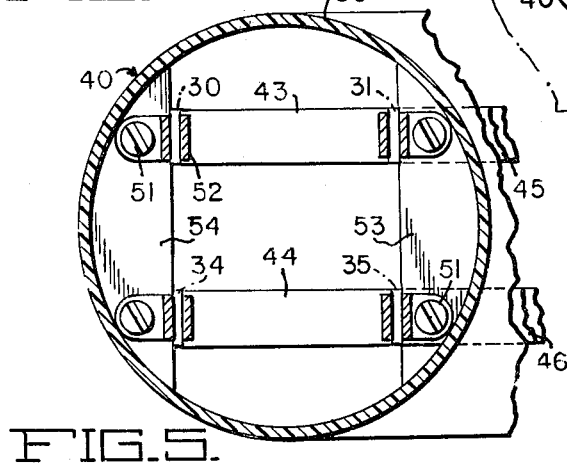
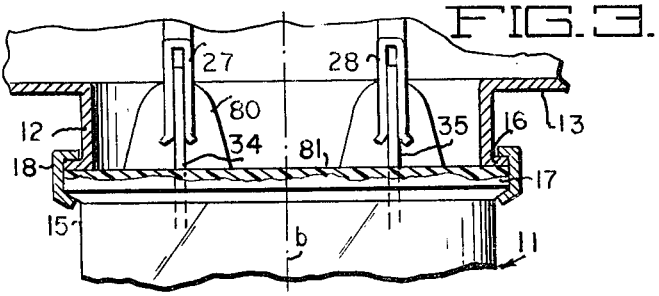
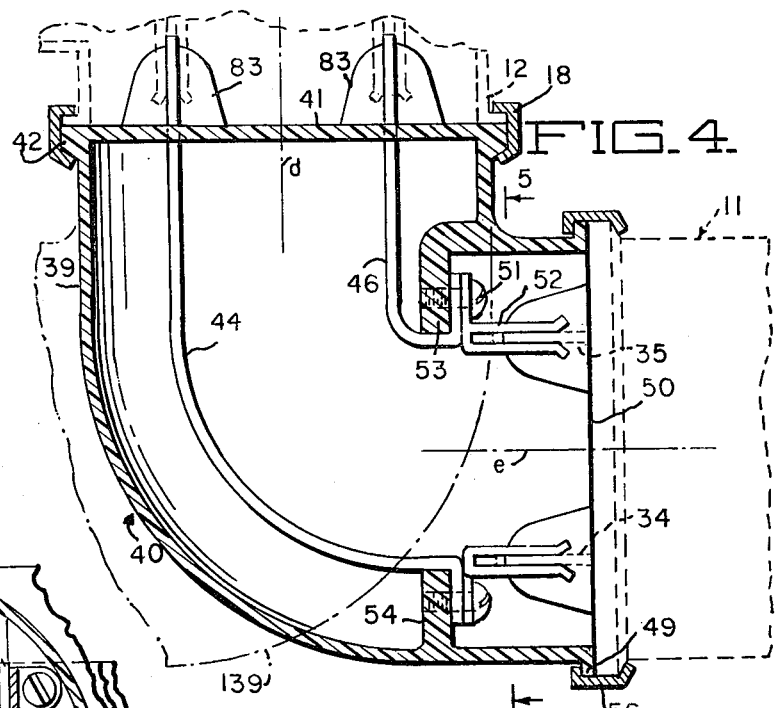
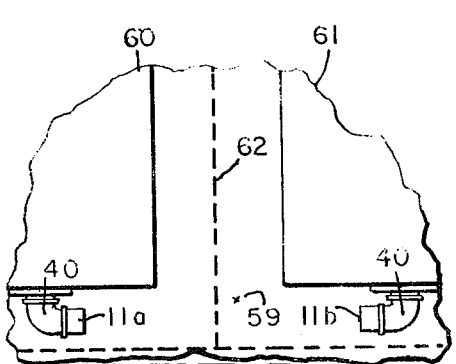
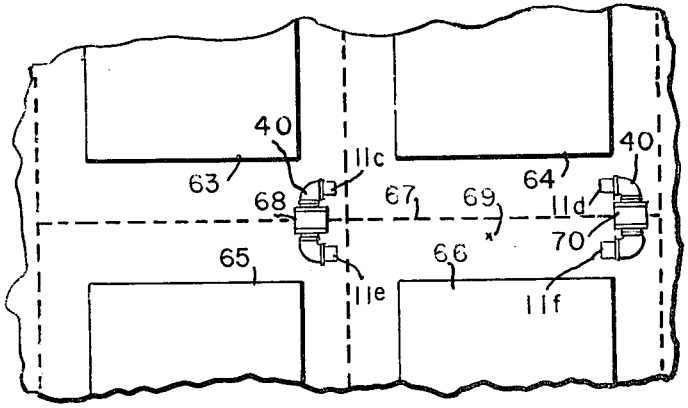

SUPPORT FOR FACILITATING READING OF AN ELECTRIC METER

This is a continuation of application Ser. No. 78,178, filed Sept. 24, 1979, now abandoned.

BACKGROUND OF THE INVENTION

1. Field of the Invention

This invention relates to meters for measuring the amount of electrical energy used over a certain period of time and has particular reference to meters of the type which are used to register the amount of electrical energy used by customers of electric power companies or the like.

2. Description of the Prior Art

In order to determine the amount of electrical energy furnished by electric power companies to their customers for billing purposes, electric energy measuring meters, such as watt hour meters, are generally connected in the electric service circuits at various customers' premises. Periodically, usually once a month, meter readers are sent to the different customers' premises to read the meters whereby the amount of electrical energy used by each customer during a preceeding billing period may be calculated.

The placement of the meters on the different customers' premises is generally determined by local building codes, the location of the electric service or by the construction of a building to which the service is connected so that little or no consideration is generally given to the convenience of reading such meters.

Generally, the meter reader must enter the premises of each customer in order to properly read each meter. This not only entails considerable time spent by the meter reader but since most meters are located at the rear of a building or at the rear of the customer's premises other difficulties are often encountered. For example, many buildings are enclosed by fencing or walls which have locked gates, preventing normal entrance. In other cases, vicious dogs are kept within such enclosures to prevent entrance of strangers.

Since millions of such meters must be read each month, it will be appreciated that the reading of electric meters of the above type is time consuming and thus expensive, particularly because of the time it takes for the meter readers to reach appropriate viewpoints to properly read the meters. Accordingly, this requires a large number of persons whose sole job is to go from one customer's premises to another to read and record different electric meters.

SUMMARY OF THE INVENTION

A principal object of the present invention is to facilitate reading of meters which register the amount of electrical energy used by customers of electric power companies.

Another object is to provide means for enabling two or more electric meters of the above type to be read from a single viewpoint.

Another object is to provide a device for readily changing the direction in which a meter of the above type faces without having to modify the meter or its supporting base or socket.

A further object is to provide a meter support of the above type which may be quickly and easily installed to change the direction in which the meter may be faced.

Another object is to provide a meter support of the above type which is simple and inexpensive to manufacture.

Another object is to provide a meter support of the above type which may be readily sealed against unauthorized tampering with the meter.

According to the present invention, a meter support device is provided which has electric contacts and annular mounting flanges similar in size, shape and location to those of the meter and its customary base or socket so that the meter support device may be readily installed on the meter base without any change or modification. Also, the meter support device is provided with a second support flange and electrical contacts which are similar to those of the meter base or socket and which are located at an angle to the mounting flange thereof so that the meter may be readily connected thereto at such angle, also without change or modification. Further, both the meter support device and the meter may each be mounted in either of two positions so that the meter may be oriented to face in a right-side-up attitude in either of two different directions which are different from that which it customarily faces when installed directly on the meter base. Therefore, the meter can be read from a viewpoint not previously possible and, also, two or more meters on different premises can be arranged to be read from the same location.

BRIEF DESCRIPTION OF THE DRAWING

The manner in which the above and other objects of the invention are accomplished will be readily understood on reference to the following specification when read in conjunction with the accompanying drawing, wherein:

FIG. 1 is a perspective view of a conventional electric watt-hour meter mounted on a conventional base.

FIG. 2 is a sectional elevation view through the meter socket and is taken along line 2—2 of FIG. 1.

FIG. 3 is a sectional plan view showing the meter base and meter attached thereto, and is taken along line 3—3 of FIG. 1.

FIG. 4 is a sectional plan view, similar to FIG. 3 but illustrating a meter support device embodying a preferred form of the present invention.

FIG. 5 is a sectional elevation view through the meter support device and is taken along the line 5—5 of FIG. 4.

FIG. 6 is a fragmentary view of one of the mounting bands for attaching the meter support device to the meter socket and for attaching the meter to the support device.

FIG. 7 is a schematic plan view illustrating the invention arranged to support meters on two adjacent buildings of different customers' premises whereby both meters can be read from a single viewpoint and from a single customer's premises only.

FIG. 8 is another schematic plan view illustrating installation of meter support devices of the present invention in association with adjacent buildings, such as mobile homes, whereby the meters for all such buildings may be read from a single viewpoint and from a single customers' premises.

DESCRIPTION OF THE PREFERRED EMBODIMENT

Although this invention is susceptible to embodiment in many different forms, there is shown in the drawings and will be described in detail one specific embodiment, with the understanding that the present disclosure is to be considered as an exemplification of the principles of the invention and is not intended to limit the invention to the embodiment illustrated. The scope of the invention will be pointed out in the appended claims.

FIGS. 1 and 3 illustrate a conventional electric watt hour meter, generally indicated at 11, which is mounted on the conventional cylindrical meter socket 12 forming part of a box like meter base 13, the latter being suitably installed, in this disclosure, in a wall 14 of a building.

The meter 11 is encased in a cylindrical transparent glass housing 15. Dials 17 operatively connected to the meter mechanism, not shown, are readable in a direction generally facing the wall 14 through the front of the transparent meter housing 15.

For the purpose of removably attaching the meter 11 to the meter socket 12, the latter is formed with an annular supporting shoulder 16 and the meter housing 15 is formed with a mating annular mounting flange 17 of the same outside diameter as flange 16. An annular split attaching and sealing band 18 (see also FIG. 6), which is generally U-shaped in cross section, is fitted over both flanges 16 and 17 to couple the same together. One end of the band 18 has a slot 20 therein to receive a locking tab 21 extending from the opposite end of the band whereby to lock the meter 11 in position on the socket 12 and to seal the interface between the meter and the socket from entrance of moisture and dirt.

In order to insure against unauthorized removal and replacement of the meter 11, a wire 19 is passed through a hole 22 in the tab 21 and the opposite ends of the wire are secured within a seal 23 of lead or the like.

It will be noted in FIGS. 2 and 3 that four meter clips 25, 26, 27 and 28 are suitably supported in the meter base 13 to extend in the meter socket 12. The upper two clips 25 and 26 customarily receive bayonets 30 and 31, respectively, extending from the meter 11 to thereby electrically connect the meter to two electric service conductors 32 and 33, respectively. Likewise, the two lower socket meter clips 27 and 28 receive bayonets 34 and 35 extending from the meter to establish electrical connections between the meter and customers' wiring conductors 36 and 37 leading to different electric load circuits on the premises.

In a three-wire service system, a central conductor 38 extends directly through the meter housing from the service wiring and forms a ground or neutral conductor. In general practice, a potential of 120 volts is applied across each of the conductors 32, 33 and the ground conductor 38 while a potential of 240 volts appears across the conductors 36 and 37.

The upper and lower bayonets 30 and 34 of the meter establish a circuit through the meter to conductor 36 so that when an electrical load is applied between the conductor 36 and ground conductor 38, the meter will be energized to register the amount of electrical energy being used. Also, the upper and lower bayonets 31 and 35 establish a circuit through the meter and through the circuit of conductor 37 so that when a load is applied between the conductor 37 and the ground conductor 38, the meter will likewise be energized to register the amount of electrical energy being used. Also, if the load is applied across both of the customer's conductors 36 and 37, the meter will register the amount of electrical energy used.

It should be noted in FIG. 2 that the meter clips 25 and 26 as well as clips 27 and 28 are located equal distances on opposite sides of a vertical plane "a" passing through the axis "b", FIG. 3, of the meter socket 12. Also, the clips 25 and 26 are located the same distance above a horizontal plane "c" passing through the axis "b" and at the same distance therefrom as are the lower clips 27 and 28.

Guide tabs 80 (FIG. 3) extend from the wall 81 of the meter 11 to guide along the side edges of the clips 25, 26, 27 and 28 to properly orient the meter about axis "b" when it is assembled on the socket 12 oriented in either of two positions 180° apart. However, the meter can be removed and reinstated 180° in either direction.

According to the present invention, a meter support device, generally indicated at 40 (FIGS. 4 and 5), is provided comprising a hollow body 39 preferably formed of plastic having a circular cross section and formed in the shape of an L. A wall 41 is formed across one end of the body 39 along with an annular mounting flange 42, similar in size and shape to the mounting flange 17 of the meter 11. Flange 42 extends concentrically about an axis "d".

Four conductor strips 43, 44, 45 and 46 extend through and are supported by the wall 41 to form bayonets to be interfitted with the aforementioned meter clips 25, 26, 27 and 28, respectively, in the meter socket 12. Thus, the body 39 may be mounted to the flange 16 of socket 12 by means of the attaching band 18 in the same way that the meter 15 is customarily attached.

Guide tabs 83, similar to tabs 80, extend from the wall 41 to guide along the side edges of the clips 25, 26, 27 and 28 to properly orient the body 39 about the axis "d" when it is assembled on the socket 12. It should be noted, however, that the body can be oriented in either of two positions 180° apart.

The opposite end 50 of the body 39 extends at right angles to the end 41 although it may also be formed to extend at other angles, if desired. The opposite ends of the conductor strips 43 to 46 are attached by screws 51 to meter clips 52, which screws also secure the clips to bosses 53 and 54 extending integrally and inwardly from the walls of the support body 39.

The four clips 52 are arranged symmetrically about the second center line "e" of the body 39 with the same pattern and the same spacing as are the clips 25 to 28 so as to receive the bayonets 30, 31, 34 and 35 of the meter 11.

The end 50 of the body 39 is formed with an annular supporting flange 49 which is similar in shape to the supporting flange 16 of the meter socket 12 so that the meter flange 17 may be mounted thereagainst by means of a second attaching band 56 similar in construction to band 18.

Because of the symmetrical arrangement of the various socket clips 52 relative to axis "e" and the similar arrangement of the bayonets extending from the conductors 43 to 46, the support body 39 may be mounted to the meter socket 12 in either the position shown in full lines in FIG. 4 or in a position disposed 180° about axis "d" as indicated by the dot-dash lines 139, thus locating the meter 11 in a position facing in the opposite direction. In such case, the meter 11 should be properly oriented on the body 39 that its dials 17 will appear right side up.

The advantages of the invention will become more readily apparent on reference to the plan view of FIGS. 7 and 8 which schematically illustrate two of many different examples of the application of the meter support device.

In FIG. 7, a pair of adjacent buildings 60 and 61 are shown on adjoining premises, the latter being separated by a fencing or wall structure indicated by the dot-dash line 62. By mounting the meters 11a and 11b of the two buildings through meter support devices 40 and by arranging the latter so that the meters face each other, the meter reader need gain entrance to one only of the premises and, from a single viewpoint, as indicated, for example, at 59 he can readily read both meters.

FIG. 8 illustrates another example wherein the meters 11c, 11d, 11e and 11f of four buildings 63, 64, 65 and 66 respectively, may be read from a single viewpoint 69 thus requiring the reader to gain entrance to one only of the premises, the latter being separated by a fencing or wall structure 67. FIG. 8 portrays a mobile home park in which it is customary for the electric service and the meters to be mounted back-to-back on posts or pedestals, as indicated at 68 and 70. In this case, two meters 11c and 11d are supported by support devices 40 to face meters 11e and 11f, also supported by support devices 40 to face meters 11c and 11d so that all may be read from a single viewpoint 69.

I claim:

1. In combination, a socket type electric meter having an annular mounting flange encircling spaced terminals of a plurality of first electrical conductors, said meter being adapted to fit a conventional meter socket having an annular seating flange sized to congruently abut said mounting flange, which seating flange extends about a horizontal axis and encircles spaced terminals of a plurality of second electrical conductors which latter terminals engage the terminals of said plurality of first electrical conductors when the meter is mounted on the socket for use, and meter support means particularly adapted for installation between said meter and said meter socket, said meter support means comprising:

a substantially hollow body characterized by the presence of a first annular flange extending about a first axis and sized to congruently abut the annular seating flange of said meter socket, and a second annular flange extending about a second axis disposed at an angle to said first axis and sized to congruently abut the annular mounting flange of said electric meter;

said meter support means including spaced terminals encircled by said first annular flange that are shaped and positioned for engagement with the spaced terminals of said plurality of second electrical conductors in either of two inverse positions about said horizontal axis, and spaced terminals encircled by said second annular flange that are shaped and positioned for engagement with the spaced terminals of said plurality of said first electrical conductors in either of two inverse positions of said meter about said second axis; and conductive means directly interconnecting the spaced terminals encircled by said first annular flange with the spaced terminals encircled by said second annular flange in a way to permit conductive interconnection of said meter with said socket through said meter support means in either of two positions facing in different directions;

whereby said meter support means can be plugged into said socket in a first position and said meter attached thereto in right-side-up position to face in one of said two directions, or can be removed from said socket and reinserted therein in a position rotated 180 degrees from said first position whereat said meter can be removed therefrom, rotated through 180 degrees and reattached thereto to face in the other of the two directions in right-side-up position.

2. A combination in accordance with claim 1 in which the spaced terminals encircled by said first annular flange are bayonet terminals and the spaced terminals encircled by said second annular flange are meter clip terminals.

3. A combination in accordance with claim 2 in which said conductive means comprise conductive strips extending through said substantially hollow body from the spaced terminals encircled by said first annular flange to the spaced terminals encircled by said second annular flange.

4. A combination in accordance with claim 3 in which said bayonet terminals are end portions of said conductive strips.

5. A combination in accordance with claim 4 including guide tabs thereon positioned to properly guide said bayonet terminals into mating contact with the spaced terminals of said second electrical conductors on said socket in either of said positions facing in different directions when said meter support means is being installed for use between said socket and an electric meter.

* * * * *